June 17, 1958   F. K. ZERBE   2,839,218
PRESSURE VESSEL CLOSURE
Filed July 6, 1954
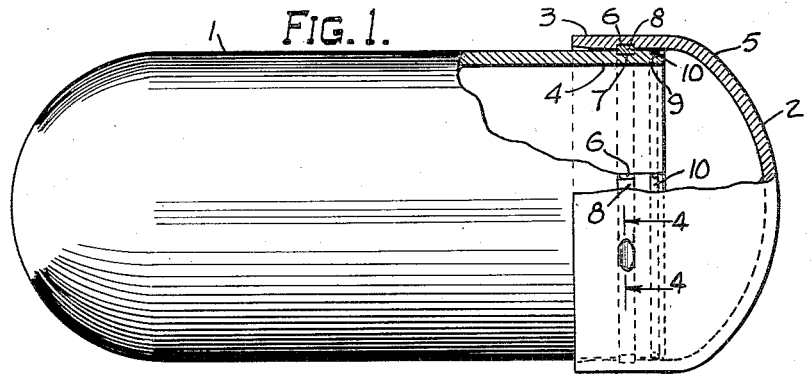
FIG. 1.
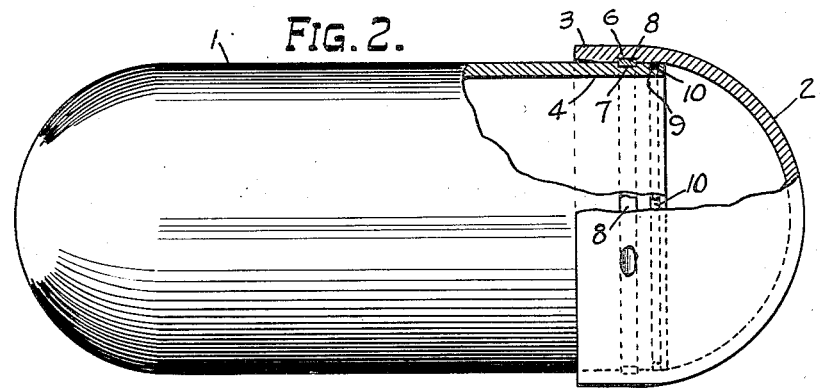
FIG. 2.
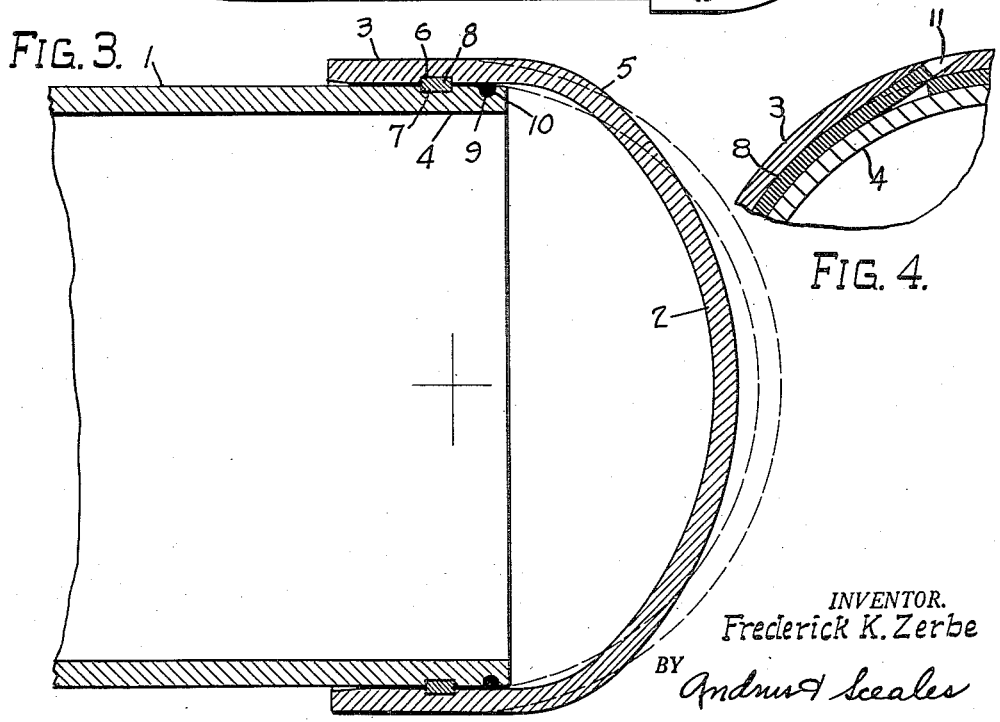
FIG. 3.
FIG. 4.
INVENTOR.
Frederick K. Zerbe
BY
*Andrus & Sceales*
ATTORNEYS.

United States Patent Office 2,839,218
Patented June 17, 1958

2,839,218
PRESSURE VESSEL CLOSURE

Frederick K. Zerbe, Houston, Tex., assignor to A. O. Smith Corporation, Milwaukee, Wis., a corporation of New York Application July 6, 1954, Serial No. 441,471

1 Claim. (Cl. 220—46)

This invention relates to vessel closures and more particularly to the joint between the head and main body or shell of pressure vessels utilized for high pressure applications in petroleum refining and other industries.

Heretofore, in the manufacture of cylindrical pressure vessels, it has been deemed necessary to design both the cylindrical body and the heads for stiffness in order to insure adequate strength throughout the entire vessel, especially at the head-to-shell joints. Prior constructions have utilized head members which were relatively non-elastic under the particular pressures to which they were subjected. In addition, the joints between the heads and cylindrical shell of the vessel have previously been designed for rigidity, and this has often necessitated heavy flanges and other material-wasting constructions.

To the knowledge of the inventor no thought had been given, prior to the present invention, to a pressure vessel construction which utilized elastic motion of the structure to produce a non-rigid head-to-shell joint which was equally as strong, if not stronger than the other parts of the vessel.

The present invention is based on the discovery that an ellipsoidal head may be joined to the cylindrical shell of a pressure vessel in such a manner so as to make the joint between the head and shell tighter as pressure within the vessel increases.

The invention contemplates securing the ellipsoidal head to the outer circumferential end portion of the cylindrical shell in a manner to make the head removable. As pressure increases within the vessel the cylinder, due to internal pressure, tends to grow in diameter. The tendency of the head under pressure is to change to a hemispherical shape, and its outer periphery at the overlapping joint between the head and shell tends to reduce rather than expand. Thus, any slight gap between the head and shell will be closed, and as the pressure increases the joint becomes tighter.

The accompanying drawing illustrates the best mode presently contemplated by the inventor for carrying out the invention.

In the drawing:

Figure 1 is a side elevation of a pressure vessel with parts broken away and sectioned and showing an ellipsoidal head;

Fig. 2 is a view similar to Figure 1 with pressure applied in the vessel to force the head toward a hemispherical shape as shown in an exaggerated manner;

Fig. 3 is a sectional view of the joint between the head and shell with the ellipsoidal head in full lines and the hemispherical shape which the head tends to assume under pressure shown in dash lines; and Fig. 4 is an enlarged section taken on line 4—4 of Fig. 1 showing the overlap of the locking band.

As shown in the drawing, the invention is embodied in a steel pressure vessel comprising a cylindrical shell 1 formed to be integrally closed at one end and which is closed at the other end by the removable head 2. Removable heads may be provided at both ends of the vessel and the invention is applicable to one or both heads of a vessel.

Referring now to head 2 and the joint construction between head 2 and shell 1, as seen in Figure 1 and the full lines in Fig. 3, head 2 comprises a cylindrical skirt portion 3 which extends over the outer surface of the end portions 4 of shell 1 a substantial distance and consequently is of greater inside diameter than shell portion 4. The skirt 3 should extend over the end portion 4 of the shell a distance sufficient to prevent bending of the skirt circumferentially outwardly when pressure is applied in the vessel due to the shearing action at the locking band.

Skirt 3 in its extent axially outwardly from the shell merges into the end closure portion 5 of head 2 that curves radially inwardly to an ellipsoidal or near-ellipsoidal shape. The construction described provides the head as a definite ellipsoidal structure when assembled with the cylindrical shell 1.

The inner surface of skirt 3 contains an annular groove 6, and the outer surface of the end portion 4 of shell 1 contains a similar groove 7. When head 2 and shell 1 are fitted together to make the joint therebetween, grooves 6 and 7 are in alignment and serve to hold a locking band 8 made of steel or other suitable material. Band 8 serves to prevent relative longitudinal motion between head 2 and shell 1.

A groove 9 is provided in the outer periphery of the end portion 4 of shell 1 between the end of shell 1 and the grooves 6 and 7 to receive a compressible elastic O-ring 10 which provides a seal between shell 1 and head 2. O-ring 10 may be of any suitable material such as soft metal or rubber and the hardness and temperature characteristics of O-ring 10 will be dictated by the particular application for which the vessel is intended. The invention contemplates the employment of any flexible seal construction in the joint between head 2 and shell 1. However, the seal is preferably as close as possible to the end of shell 1 and adjacent the knuckle of the head to obtain the most effective compression of the seal.

In assembling the vessel closure, O-ring 10 is placed in groove 9 and head 2 is slipped over shell 1 so that grooves 6 and 7 are in alignment. Locking band 8 is inserted into grooves 6 and 7 from the outside through an opening 11 in the head, which is approximately tangential to the grooves. After band 8 is entirely inserted, the two ends of the band will overlap in the region of opening 11, as shown in Fig. 4. A small hole may be placed in band 8 near the outermost end and facing the opening so that it will be possible to attach removing means to band 8 so that the closure may be disassembled.

The initial ellipsoidal or nonhemispherical shape of head 2 and the joint construction of the invention result in operation of the invention as follows: As the pressure within the vessel is increased shell 1 will tend to expand a slight amount. At the same time, the internal pressure in the vessel acting on head 2 tends to shape the head elastically and the head will tend to assume a hemispherical shape as shown in full lines in Fig. 2 and dash lines in Fig. 3. Under the tendency of head 2 to obtain a hemispherical shape skirt 3 of the head will contract in diameter and the combination of the expanding forces in shell 1 and the contracting forces of skirt 3 will cause the joint between the head and shell to become tighter. The more the pressure is increased within the vessel, the greater the compression of O-ring seal 10, and the tighter the seal between head 2 and shell 1.

In addition, the clearance between the head and shell adjacent locking band 8 will be reduced thereby lessening any shearing action which would tend to deform band 8 and destroy its locking function.

When the head 2 tends to move from an ellipsoidal shape toward a hemispherical shape the distance across the surface of the head from one outer edge portion of the locking band 8 to an opposite outer edge portion of band 8 always remains the same under the tendency of the skirt portion of the head to contract when the head tends to obtain hemispherical shape.

The strength of the joint between the head and shell is substantial, and tests of a vessel constructed in accordance with the invention have conclusively proved that the stresses at the joint are of a much lower order than in other critical parts of the vessel.

The invention provides a joint between the head and shell of a pressure vessel that takes advantage of the head construction to provide an efficient seal of the joint that becomes even more effective as the pressure inside the vessel increases, and also makes the locking means more secure.

Various modes of carrying out the invention are contemplated as within the scope of the following claim particularly pointing out and distinctly claiming the subject matter which is regarded as the invention.

I claim:

In a high pressure vessel having a cylindrical shell and end closures therefor, a removable closure at one end of said shell comprising, a substantially ellipsoidal head member having a substantially cylindrical skirt portion loosely overlying the end of said shell and telescoping the same in radially spaced relation thereto, said head member being flexible at the operating pressures for said vessel to effect an elastic deformation of the head toward a hemispherical shape under load, sealing means disposed circumferentially of the vessel and bridging the space between said head skirt and said shell near the outer end of the latter, and a removable locking band disposed in mating annular grooves in said shell and said head skirt spaced farther from the end of the shell than said sealing means, whereby the higher the pressure in said vessel the greater the deformation of said head member and the greater the confinement of said sealing means between said head skirt and said shell to effect a tight seal therebetween.

References Cited in the file of this patent

UNITED STATES PATENTS

| | | |
|---|---|---|
| 1,173,422 | Grannis | Feb. 29, 1916 |
| 1,312,626 | Grannis | Aug. 12, 1919 |
| 1,946,494 | Horton | Feb. 13, 1934 |
| 2,354,532 | Martin | July 25, 1944 |
| 2,436,407 | Stephens | Feb. 24, 1948 |
| 2,532,854 | Plumber | Dec. 5, 1950 |

FOREIGN PATENTS

| | | |
|---|---|---|
| 291,320 | Great Britain | May 31, 1928 |
| 72,036 | Germany | Nov. 23, 1893 |
| 920,539 | France | Jan. 4, 1947 |